United States Patent
Chang

(10) Patent No.: US 9,651,242 B2
(45) Date of Patent: May 16, 2017

(54) ILLUMINATING DEVICE HAVING FOLDING SOLAR PANELS

(71) Applicant: Kuei-Hsiang Chang, Antioch, CA (US)

(72) Inventor: Kuei-Hsiang Chang, Antioch, CA (US)

( * ) Notice: Subject to any disclaimer, the term of this patent is extended or adjusted under 35 U.S.C. 154(b) by 286 days.

(21) Appl. No.: 13/674,838

(22) Filed: Nov. 12, 2012

(65) Prior Publication Data

US 2014/0133138 A1  May 15, 2014

(51) Int. Cl.
*F21V 3/00* (2015.01)
*F21V 31/00* (2006.01)
*F21S 9/03* (2006.01)
*F21W 131/10* (2006.01)
*F21W 131/109* (2006.01)

(52) U.S. Cl.
CPC ............ *F21V 31/005* (2013.01); *F21S 9/037* (2013.01); *F21V 3/00* (2013.01); *F21W 2131/10* (2013.01); *F21W 2131/109* (2013.01)

(58) Field of Classification Search
CPC ..... F21L 13/00; F21L 4/00; F21L 7/00; F21L 4/085; F21L 4/08; F21V 25/00; F21V 23/0414; F21V 32/00; F21Y 2101/02
USPC ......................................... 362/183, 157, 158
See application file for complete search history.

(56) References Cited

U.S. PATENT DOCUMENTS

| | | | |
|---|---|---|---|
| 4,243,238 A * | 1/1981 | Johnson .......................... | 280/20 |
| 5,510,970 A * | 4/1996 | Hollenbach et al. ......... | 362/396 |
| 5,833,351 A * | 11/1998 | Marsh ....................... | E04C 1/39 |
| | | | 362/145 |
| 6,218,620 B1 * | 4/2001 | Michel ............................. | 174/92 |
| 6,339,188 B1 * | 1/2002 | Voelkner ....................... | 136/251 |
| 2004/0049894 A1 * | 3/2004 | Jackson et al. ................. | 24/293 |
| 2007/0074463 A1 * | 4/2007 | Ziegelman ..................... | 52/79.1 |
| 2008/0170389 A1 * | 7/2008 | Lavigne ........................ | 362/183 |
| 2010/0154786 A1 * | 6/2010 | Li .......................... | A45B 23/00 |
| | | | 126/624 |
| 2012/0033413 A1 * | 2/2012 | Liu ............................... | 362/183 |

FOREIGN PATENT DOCUMENTS

JP    2001097293    * 9/1999    ............... B64G 1/44

* cited by examiner

*Primary Examiner* — Jong-Suk (James) Lee
*Assistant Examiner* — Mark Tsidulko
(74) *Attorney, Agent, or Firm* — Bui Garcia-Zamor; Jessica H. Bui, Esq.

(57) ABSTRACT

An illuminating device having folding solar panels, which comprises a lamp cover, a light source, two solar panels, and a folding holder on which the two solar panels are positioned. The opening of the lamp cover is smaller than the deployed area of the folding holder. When it is intended to place the light source, solar panels, and folding holder inside the lamp cover, the folding holder are folded by a predetermined angle so as to pass through the opening of the lamp cover. Accordingly, the illuminating device may significantly reduce the overall volume thereof without compromising the working efficiency. The illuminating device is flexible in arrangement and assembly, and is also more flexible in construction since the solar panels may be positioned at the highest portion to absorb more sunlight.

9 Claims, 4 Drawing Sheets

ILLUMINATING DEVICE HAVING FOLDING SOLAR PANELS

TECHNICAL FIELD

The present invention is related to an illuminating device having folding solar panels mounted inside a lamp cover and, more specifically, an illuminating device that does not need an external power supply, but operates to store electricity and illuminate by means of electricity generated by solar energy.

BACKGROUND OF THE INVENTION

One common illuminating device that uses solar energy for gardening or decoration purpose is as shown in FIG. 1A. Such an illuminating device has a solar panel 91 provided outside a lamp cover 93. However, such an arrangement occupies a lot of space and is unesthetic. Further, as the solar panel 91 is exposed to outside the lamp cover, it is prone to be damaged by weather or inappropriate operation of user. Besides, as the solar panel 91 is located at a lower altitude, it tends to be blocked by the surrounding plants or objects, and the power generating efficiency thereof is seriously affected.

To overcome the above defect, it has been suggested to incorporate the solar panel 91 with the light source 92 inside the lamp cover 93. Such arrangement may reduce the occupying space, and protect the solar panel 91. However, as the volume of the solar panel 91 increases, not only the volume of the lamp cover 93 has to be increased accordingly, but also the opening 931 for the access of the solar panel at the bottom of the lamp cover 93 has to be enlarged to an extent for allowing the solar panel 91 to pass through. Accordingly, the volume of the illuminating device will be increased, and the base device mounted at the opening becomes bulky, giving an unaesthetic appearance to the lamp, which is disadvantageous to the gardening or decoration arrangement.

SUMMARY OF THE INVENTION

Therefore, it is an object of this invention to provide an illuminating device having folding solar panels mounted inside the lamp cover, which may significantly reduce the dimension of the opening of the lamp cover to allow the same solar panel to pass through, and yet do not have to compromise the working efficiency of the solar panel. Besides, the illuminating device according to this invention is esthetic in appearance, and is integral and flexible in construction. Further, as the solar panel is located at a higher altitude, it has more open space enable the solar panel to collect maximum sunlight.

The illuminating device having folding solar panels according to the present invention comprises a lamp cover, a light source, at least two solar panels, and a folding holder.

The lamp cover comprises an opening, a light source electrically connected to the lead line. The at least two solar panels are electrically connected to the light source. The folding holder comprises a bore through which the lead line of the light source passes. The at least two solar panels are disposed on the folding holder. The opening of the lamp cover is smaller than the deployed area of the folding holder. When it is intended to place the light source, solar panels, and folding holder inside the lamp cover, or to remove the light source, solar panels, and folding holder from the lamp cover, the folding holder is folded to form a predetermined angle therebetween so as to pass through the opening of the lamp cover.

The folding holder according to the present invention may comprise at least two receiving seats pivotally connected to each other which are adapted to receive at least two solar panels.

Preferably, the present invention comprises two solar panels, and the folding holder comprises two receiving seats. The two solar panels are connected in series or in parallel, and are electrically connected to an anode wire and a cathode wire, respectively. Each receiving seat includes a through hole through which the anode or cathode wire may pass. After the light source, solar panels, and folding holder have been placed inside the lamp cover, the anode wire and cathode wire are pulled downwardly towards the opening, so that the two receiving seats are stretched flat to lie horizontally.

Accordingly, the folding holder according to the present invention may be inserted into the lamp cover in a folded pattern, and extend flat inside the lamp cover by pulling the anode wire and cathode wire of the solar panels, so that the solar panels may have a larger light absorption area.

More preferably, the present invention may comprise a retaining sheet having at least two elastic supporting brackets and a central hole through which the lead line, anode wire, and cathode wire pass. The at least two elastic supporting brackets are disposed on the upper surface of the retaining sheet, and at least two elastic supporting brackets may urge against the inner wall surface of the lamp cover. Accordingly, the present invention may secure the light source and folding holder inside the lamp cover by means of the retaining sheet.

More preferably, the present invention may further comprise a water-resistant gasket having grommet. The water-resistant gasket is arranged underneath the retaining sheet. The grommet is securely attached to the central hole of the retaining sheet which the lead line, anode wire, and cathode wire may pass in a fitting manner. Accordingly, the grommet is designed to tightly secure the lead line, anode wire, and cathode wire together, so that the light source, folding holder, and solar panels are securely fixed. The water-resistant gasket can effectively prevent the water from leaking through between the lamp cover and lower housing to jeopardize the electric circuit board and battery. Furthermore, the tight fit provided by the grommet of the water-resistant gasket is beneficial to secure the anode wire, cathode wire, and lead line of the light source, so as to maintain the folding holder in the substantially flat position, and to secure the light source on top of the solar panels.

Furthermore, the folding holder of the present invention may comprise a base plate, and two U-shaped side walls which are arranged to oppose each other and extend vertically upwards from the base plate. The two U-shaped side walls are spaced from each other by a predetermined distance at the center portion of the base plate. Accordingly, the folding holder can be folded easily at the center portion where is absent in side wall.

BRIEF DESCRIPTION OF THE DRAWINGS

The present invention will now be described with reference to the accompanying drawings illustrating preferred embodiments, in which.

DETAILED DESCRIPTION OF INVENTION

Figure 1A:
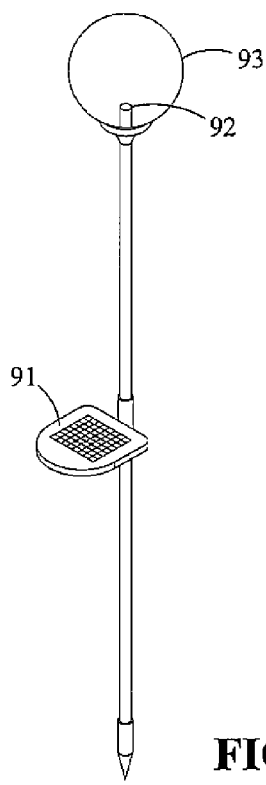
FIG. 1A is a schematic view of a conventional solar powered illuminating device.
Figure 1B:
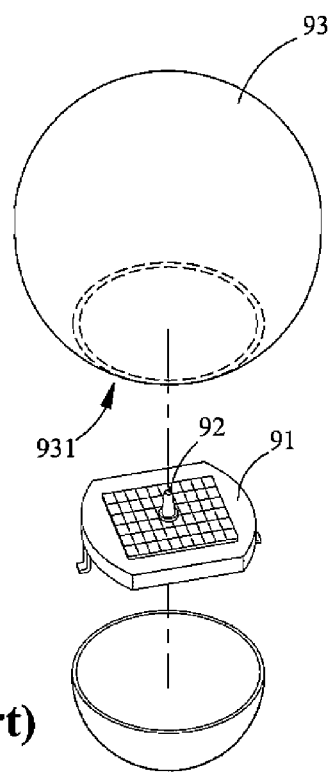
FIG. 1B is an exploded view of another conventional solar powered illuminating device.
Figure 2:
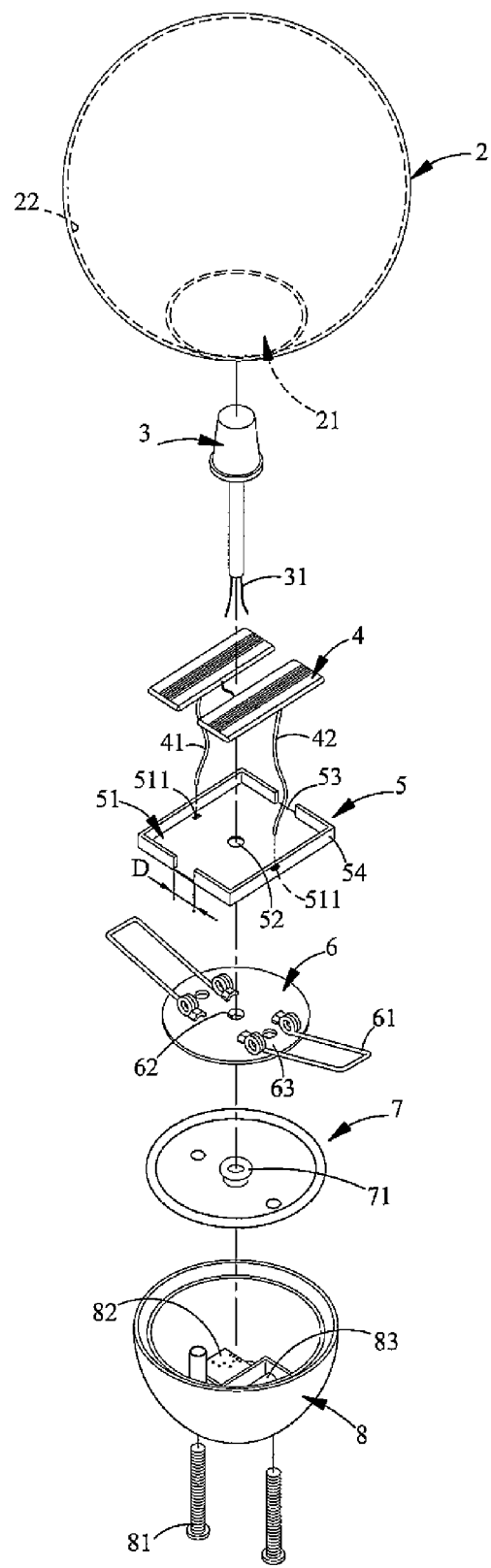
FIG. 2 is an exploded view of a preferred embodiment according to the present invention.
Figure 3:
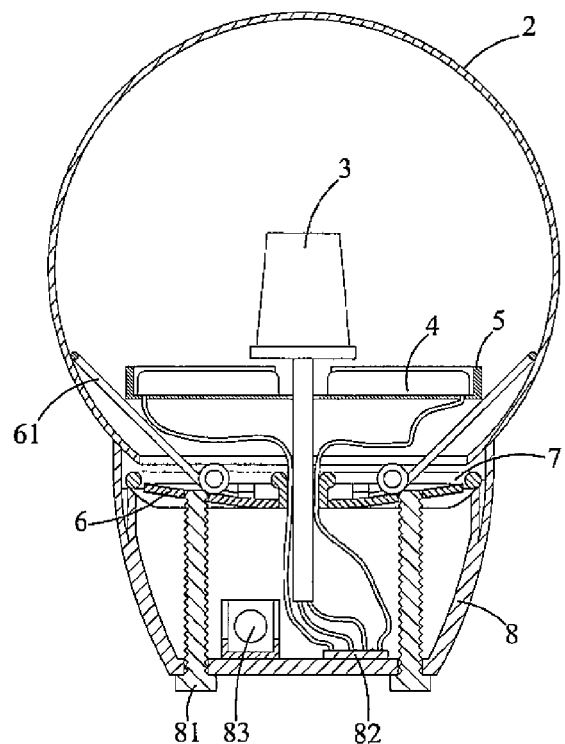
FIG. 3 is a cross sectional view of a preferred embodiment of the present invention.

In describing the preferred embodiment of the present invention, reference will be made to FIGS. 2 and 3, in which FIG. 2 is an exploded view of a preferred embodiment according to the present invention, and FIG. 3 is a sectional view of the preferred embodiment according to the present invention. As shown in the figures, an illuminating device having folding solar panels according to the present invention comprises a lamp cover 2, a light source 3, a pair of solar panels 4, a folding holder 5, a retaining sheet 6, a water-resistant gasket 7, a lower housing 8, an electric circuit board 82, and a battery 83.

The lamp cover 2 includes an opening 21, which is smaller than the deployed area of the folding holder 5. That is, when the folding holder 5 is extended, or when it is in its unfold form, it may not pass through the opening 21. The light source 3 is electrically connected to the lead line 31, and the pair of solar panels 4 is electrically connected to the light source 3. In the preferred embodiment, the light source 3 is a light emitting diode. The folding holder 5 includes a pair of receiving seats 51, and a central bore 52. The two receiving seats 51 are pivotally connected to each other. Each of the two solar panels 4 is received in each respective receiving seat 51. A lead line 31 of the light source 3 passes through the central bore 52. The folding holder 5 comprises a base plate 53 and two U-shaped side walls 54 which are arranged to oppose each other and extend vertically upwards from the base plate 53. The two U-shaped side walls 54 are spaced from each other by a predetermined distance D at the center portion of the base plate 53. Accordingly, the folding holder 51 can be folded easily at the center portion. In this preferred embodiment, the folding holder 5 is integrally formed. However, those skilled in the art will recognize that the folding holder according to this invention is not limited to the embodiment described. The folding holder 5 can also be formed of a number of assembled parts.

The two solar panels 4 are serially connected to each other and are electrically connected to an anode wire 41 and a cathode wire 42, respectively. Each receiving seat 51 has a through hole 511 through which the anode or cathode wire 41, 42 may pass. The retaining sheet 6 comprises a pair of elastic supporting brackets 61, a central hole 62, and a plurality of fixing holes 63. The two elastic supporting brackets 61 are provided on the upper surface of the retaining sheet 6, and may be extended outwardly to urge against the inner wall surface 22 of the lamp cover 2, so as to securely support the light source 3 and the folding holder 51 inside the lamp cover 2.

The water-resistant gasket 7 is arranged underneath the retaining sheet 6. The water-resistant gasket 7 comprises a grommet 71 securely attached to the central hole 62, through which the lead line 31, anode wire 41, and cathode wire 42 may pass in a fitting manner. Accordingly, in this preferred embodiment, the grommet 71 is designed to tightly secure the lead line 31, anode wire 41, and cathode wire 42 together, so that the light source 3, folding holder 5, and solar panel 4 are securely fixed.

In the drawings, a lower housing 8, a plurality of screws 81, an electric circuit board 82, and a battery 83 are shown. The electric circuit board 82 is electrically connected to the battery 83, and both the electric circuit board 82 and the battery 38 are mounted in the lower housing 8. The light source 3 and the solar panels 4 are electrically connected to the electric circuit board 82 through the lead line 31, anode wire 41, and cathode wire 42, respectively.

Figure 4A:
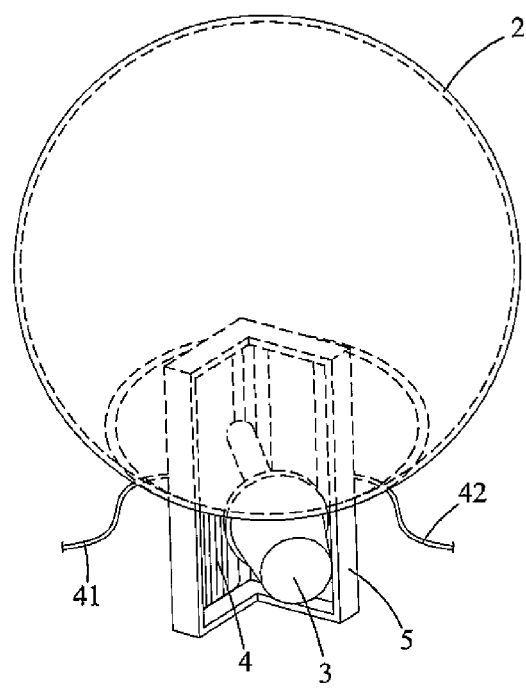
FIGS. 4A to 4C are schematic views showing the operation of the preferred embodiment of the present invention.
Figure 4B:
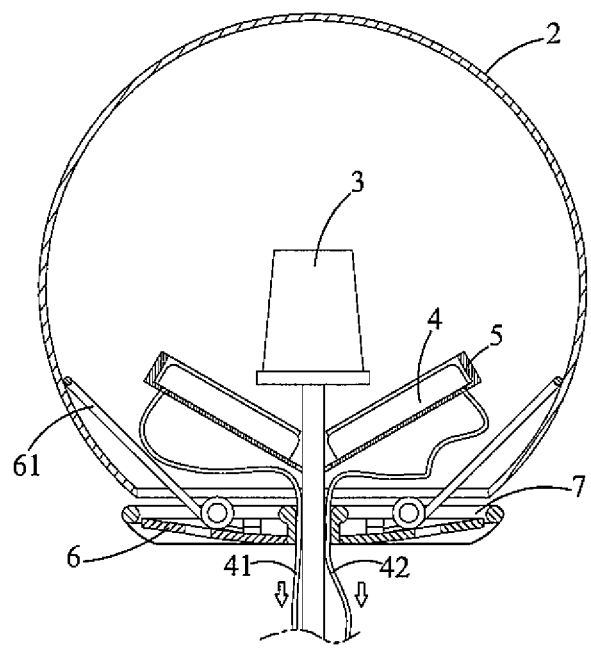
Figure 4C:
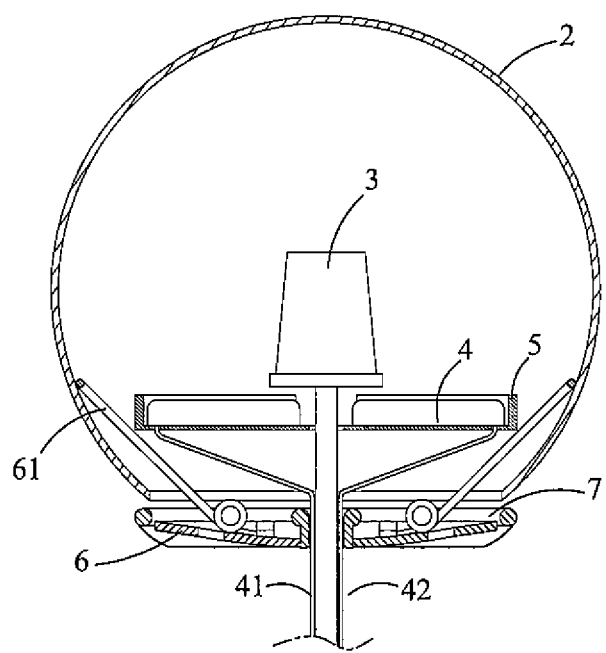

With reference to FIGS. 4A to 4C which schematically show the operation of a preferred embodiment of the present invention. As shown in the drawings, when it is intended to place the light source 3, solar panels 4, and folding holder 5 inside the lamp cover 2, the two receiving seats 51 of the folding holder 5 are folded to form a predetermined angle therebetween so as to pass through the opening 21 of the lamp cover 2. The predetermined angle is preferably in the range of between 10° and 170°, and most preferably, between 30° and 160°. After the light source 3, solar panels 4, and folding holder 5 have been placed inside the lamp cover 2, the anode wire 41 and cathode wire 42 are pulled downwardly towards the folding holder 5, so that the two receiving seats 51 are stretched flat in a substantially horizontal direction. At this point, the anode wire 41 and cathode wire 42 are tightly secured by the grommet 71 of the water-resistant gasket 7, to prevent them loosing of them, so as to maintain the folding holder 5 in the substantially horizontal position.

When the folding holder 5 lies completely flat in the lamp cover 2, a plurality of screw 81 are extended upwardly from the bottom of the lower housing 8, to pass through the lower housing 8 and water-resistant gasket 7 and threaded into the fixing holes 63 of the retaining sheet 6, so as to securely lock the retaining sheet 6 to the lower housing 8, thus completing the assembling process. The disassembling of the device can be easily accomplished by simply reversing the above operation steps.

In view of the above, the folding holder 5 according to the present invention may pass through the opening 21 of the lamp cover 2 in a folded pattern, and extend flat inside the lamp cover 2 by pulling the anode wire 41 and cathode wire 42 of the solar panels 4, so that the solar panels 4 may have a larger light absorption area. Accordingly, the solar panel can be inserted into the lamp cover having an opening reduced in dimension, without compromising the working efficiency of the solar panel.

Although the foregoing has been described in terms of presently preferred embodiment, those skilled in the art will recognize that the invention is not limited to the embodiment described. The device of the present invention can be practiced with modification and alteration within the spirit and scope of the appended claims. The description is thus to be regarded as illustrative instead of limiting the present invention.

What is claimed is:
1. An illuminating device having folding solar panels comprising:
   an enclosed hollow lamp cover having at least one opening with a diameter;
   a light source electrically connected to a lead line;
   at least two solar panels for supplying electrical power to the light source; and
   a foldable holder having a bore, the at least two solar panels being borne on the foldable holder, and the lead line of the light source being passed through the bore;
   wherein the foldable holder is a flexible base plate foldable along a center portion and provided with at least two receiving seats at respective side of the center portion to receive the at least two solar panels;

wherein the diameter of the opening of the lamp cover is smaller than a size of the foldable holder in an unfolded form, wherein the foldable holder is folded to form a predetermined angle so as to pass through the opening of the lamp cover, in order to place the foldable holder, the solar panels and the light source inside the lamp cover or to remove therefrom the lamp cover, and wherein the foldable holder is unfolded in the unfolded form such that the foldable holder along with the solar panels and the light source are supported inside the lamp cover, when the foldable holder is placed inside the lamp cover.

2. The illuminating device according to claim 1, wherein the foldable holder is further comprised of two U-shaped side walls arranged at opposite ends, spaced from each other by a predetermined distance from the center portion of the base plate, and extend vertically upwards from the base plate.

3. The illuminating device according to claim 1, wherein the two solar panels are electrically connected to an anode wire and a cathode wire, respectively, each of the two receiving seats includes a through hole through which the anode or cathode wire passes, so that after placing the light source, the solar panels, and the foldable holder, through the opening of the lamp cover, inside the lamp cover, the two receiving seats are stretched to lie flat horizontally by pulling the anode wire and cathode wire toward outside the opening of the lamp cover.

4. The illuminating device according to claim 3, further comprising:

a retaining sheet having two or more elastic supporting brackets provided on an upper surface of the retaining sheet, and a central hole through which the lead line of the light source, the anode wire, and the cathode wire of the solar panels pass, wherein the two or more elastic supporting brackets are arranged through the opening of the lamp cover to urge against the surface of inner wall of the lamp cover.

5. The illuminating device according to claim 4, further comprising:

a water-resistant gasket having a grommet, wherein the water-resistant gasket is provided underneath the retaining sheet, the grommet is fastened in the central hole of the retaining sheet, and the lead line of the light source, the anode wire and cathode wire of the solar panels are arranged to pass through the grommet in a tight fitting manner.

6. The illuminating device according to claim 5, further comprising:

a lower housing for accommodating the water-resistant gasket and the retaining sheet therein and for covering the opening of the lamp cover, and a plurality of screws, the plurality of screws being arranged to extend through the lower housing and the water-resistant gasket, and threaded into corresponding fixing holes of the retaining sheet.

7. The illuminating device according to claim 3, further comprising:

an electric circuit board and a battery electrically connected thereto, the light source and the solar panels being electrically connected to the electric circuit board through the lead line, anode wire, and cathode wire for charging the battery and lighting the light source.

8. The illuminating device according to claim 3, wherein the foldable holder is further comprised of a pair of U-shaped side walls to construct the two receiving seats, the pair of U-shaped side walls being arranged opposite to each other with the U-shaped side walls vertically extending from the base plate, and being spaced from each other by a predetermined distance from the center portion of the base plate.

9. The illuminating device according to claim 1, wherein the predetermined angle ranges from 10° to 170°.

* * * * *